United States Patent

Emmert

[11] Patent Number: 5,216,854
[45] Date of Patent: Jun. 8, 1993

[54] LAMINATED PANEL MODULAR BUILDING STRUCTURE AND ASSEMBLY METHOD

[76] Inventor: Raymond L. Emmert, 8028 NW. 20th, Oklahoma City, Okla. 73127

[21] Appl. No.: 724,072

[22] Filed: Jul. 1, 1991

Related U.S. Application Data

[63] Continuation-in-part of Ser. No. 536,370, Jun. 11, 1990, Pat. No. 5,081,810.

[51] Int. Cl.$^5$ .............................. E04B 1/32; E04B 7/06
[52] U.S. Cl. ........................................ 52/81.5; 52/82; 52/586
[58] Field of Search ............... 52/80, 82, 245, 248, 52/90, 300, 221, 586, 741; 174/48

[56] References Cited

U.S. PATENT DOCUMENTS

| | | | |
|---|---|---|---|
| 390,589 | 10/1888 | Goodnow | 52/71 |
| 2,231,065 | 2/1941 | Gabel | 52/82 |
| 2,670,818 | 3/1954 | Hacker | 52/80 |
| 3,068,534 | 12/1962 | Hu | 52/90 |
| 3,330,084 | 7/1967 | Russell | 52/300 |
| 3,738,083 | 6/1973 | Shimano | 52/271 |
| 3,783,563 | 1/1974 | Moore | 52/11 |
| 4,163,349 | 8/1979 | Smith | 52/241 |
| 4,275,534 | 6/1981 | Porter | 52/82 |
| 4,375,010 | 2/1983 | Mollenkopf | 174/48 |
| 5,081,810 | 1/1992 | Emmert | 52/221 |

FOREIGN PATENT DOCUMENTS

| | | | |
|---|---|---|---|
| 571061 | 2/1959 | Canada | 52/248 |
| 1094439 | 12/1960 | Fed. Rep. of Germany | 52/82 |
| 2537186 | 6/1984 | France | 52/90 |
| 603573 | 6/1948 | United Kingdom | 52/82 |

*Primary Examiner*—James L. Ridgill, Jr.
*Attorney, Agent, or Firm*—Robert K. Rhea

[57] ABSTRACT

A building structure formed from modular units. Each unit comprising a plurality of structurally reinforced insulating panels of standard wall panel dimensions joined in longitudinal edge juxtaposed relation. The upper end edge surfaces of upwardly converging roof forming units abut cooperating marginal side walls of a box frame structure in self supporting relation.

15 Claims, 3 Drawing Sheets

U.S. Patent       June 8, 1993       Sheet 1 of 3       5,216,854
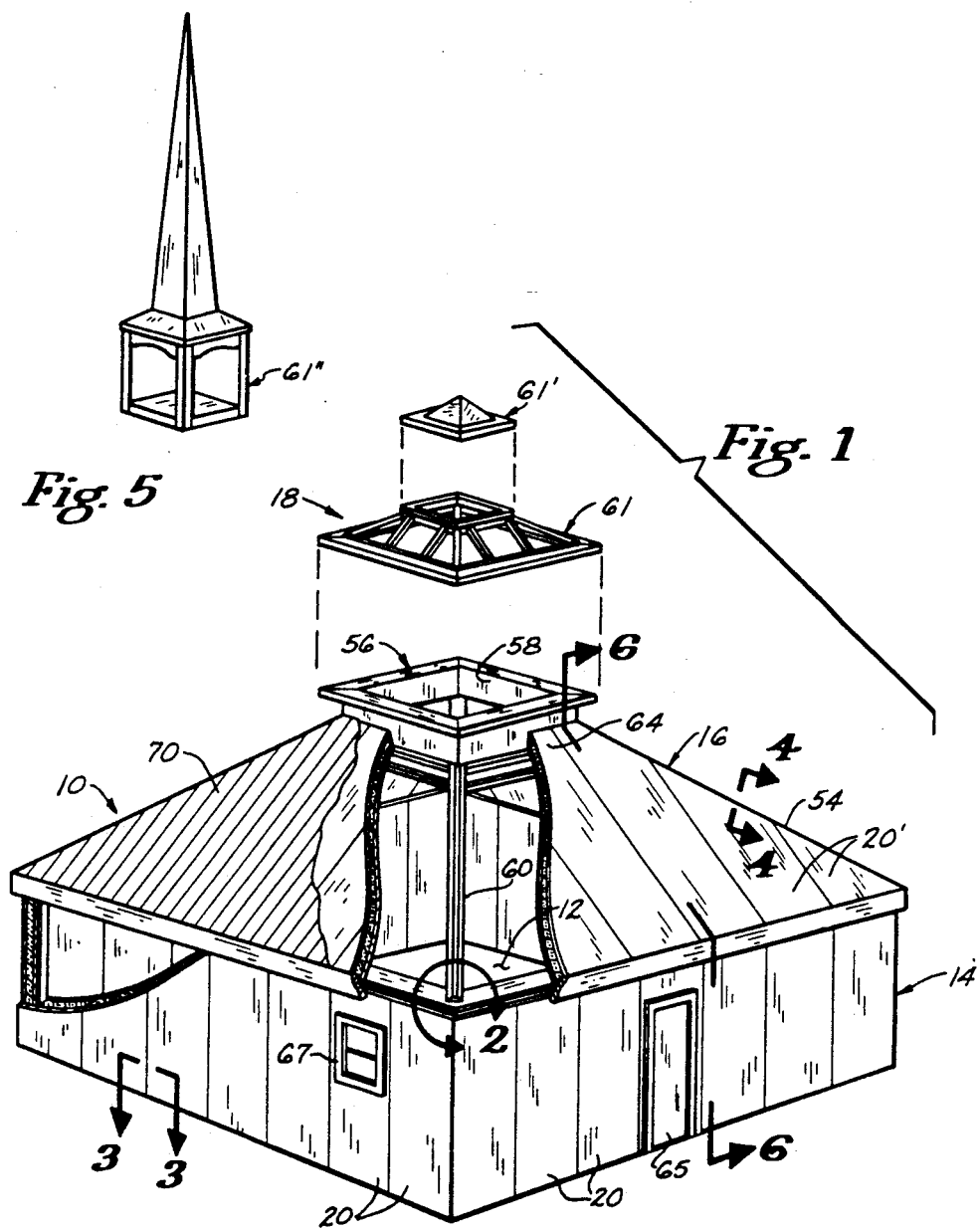
Fig. 1
Fig. 5
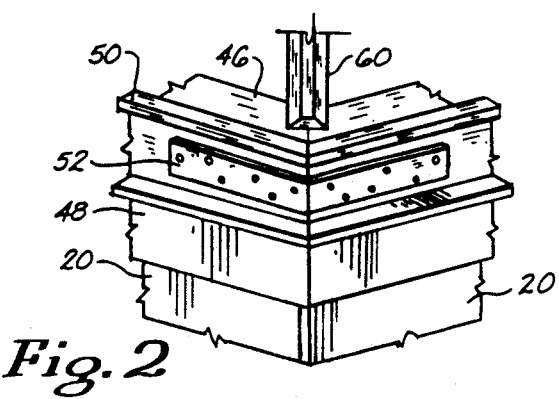
Fig. 2
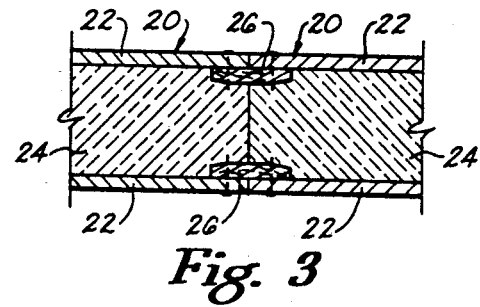
Fig. 3

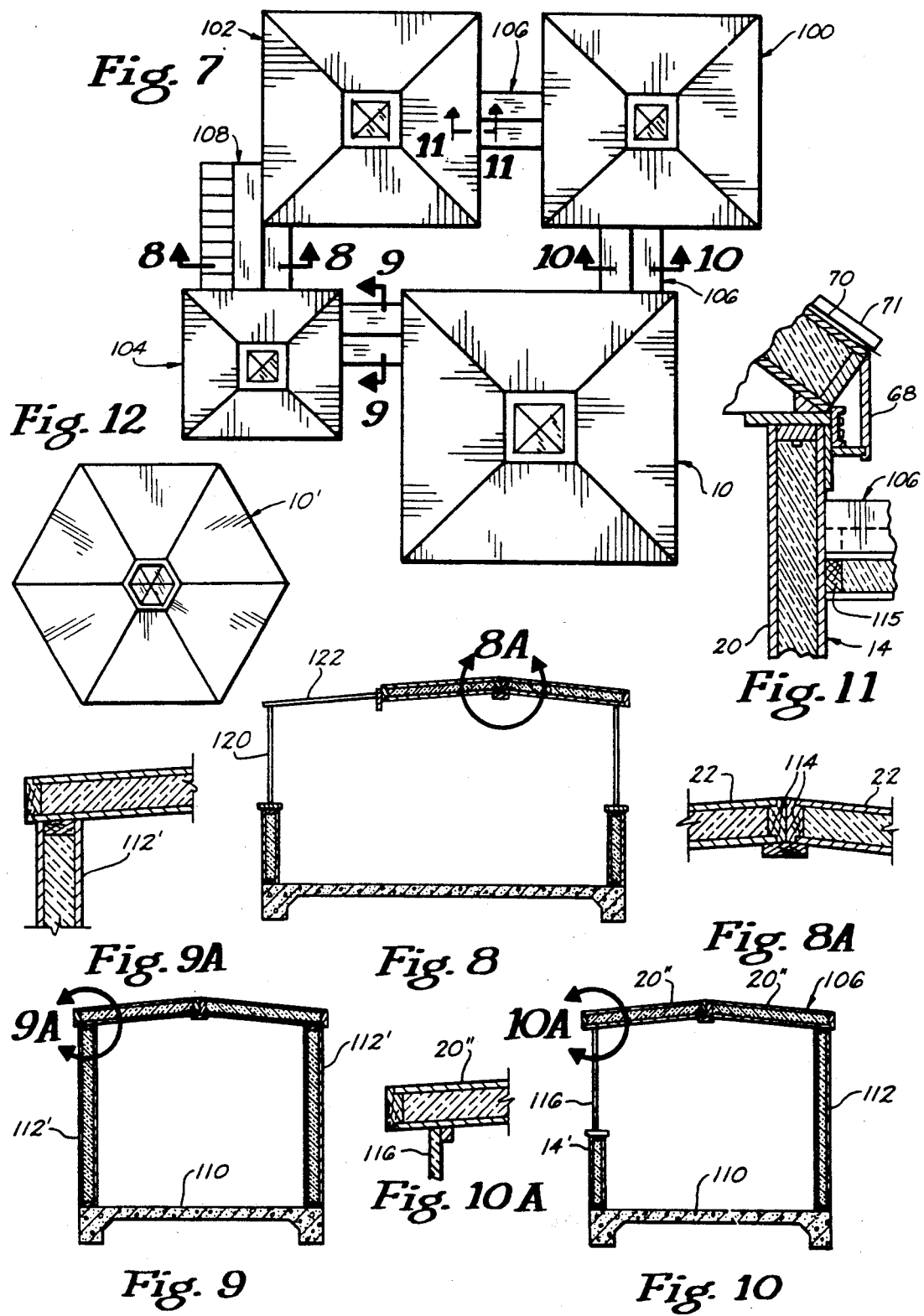

LAMINATED PANEL MODULAR BUILDING STRUCTURE AND ASSEMBLY METHOD

CROSS REFERENCE TO RELATED APPLICATION

This application is a continuation-in-part of an application filed by me in the United States Patent and Trademark Office on Jun. 11, 1990, U.S. Ser. No. 07/536,370 for BUILDING PANEL, now U.S. Pat. No. 5,081,810 issued Jan. 21, 199 .

BACKGROUND OF THE INVENTION

1. Field of the Invention

This invention relates to sandwich panels and more particularly to factory fabricated field assembled modular building structures and methods of assembly which efficiently utilize laminated sandwich panels.

There has been much effort and extensive work done in recent years to find solutions to the housing and building needs of third world countries and other low income areas of the world.

Heretofore, most of the efforts to solve the housing and community building needs for the less fortunate have met with little or no success. There are numerous reasons why others have had little success but the primary reason is that no one has been able to deliver a low cost, pre-packaged, factory fabricated, efficient, easy to assemble, structurally sound aesthetically appealing unit to the area of need. In order to meet such demanding criteria, it is necessary to provide a pre-engineered, insulated structural panel which can be produced and fabricated to exacting dimensional and structural standards and then effectively utilize that panel not only for the walls and partitions but also for the roof without depending upon other primary structural roof supports.

This invention discloses a novel and unique building system which utilizes laminated panels structurally not only for the walls but also for a completely self supporting cathedral type roof. Such a laminated panel roof structure, without requiring interior supports, makes an exceptionally efficient and versatile building with the option of leaving the interior completely open or arranging interior partitions for complete design flexibility. The efficient module units of this invention may be joined with passageway connectors to provide a wide variety of building combinations and arrangements. Used singly, the module units provide aesthetic single family dwellings or used in combination and various sizes, they become an impressive complex structure suitable for many purposes.

2. Description of the Prior Art

Some prefabricated sandwich panel systems use post and beam wall and roof primary structures to which they attach wall panels. Others support roof panels with interior walls or ridge beams. Still others use conventional roof trusses to which they attach the sandwich panels. None use the panels themselves as the primary roof support.

U.S. Pat. No. 3,783,563 is an example of prefabricated building components. This patent discloses a structure using panel and connector modules of molded plastic material reenforced with glass fibers. The connector modules are elongated beam-like members having longitudinal extension open channels adapted to receive complimentary ribs on the edges of generally flat panel modules. The connector modules permit the assembling of panels in any desired angular relationship and are provided with interior passageways constituting conduits for electrical wiring, heating, water and waste facilities. In general, the panel members are provided at their edges with channels or ribs of special design adapted to mate with complimentary structures on elongated connector members to join the panels in any desired angular or coplanar relationship.

This invention is distinctive over this and the above mentioned systems in that it provides a completely self supporting paneled roof structure and other unique and novel associated systems by a panel, as disclosed in my above referred to copending application, formed by a pair of skins or face sheets bonded to an insulating core to form a panel unit of standard building panel dimensions normally having a length at least twice its width. The core is divided into three longitudinal sections, the major central section being ⅔ the width of the panel and two elongated longitudinal edge sections each being 1/6 the width of the panel. A pair of elongated planar stiffeners or bracing members, coextensive with the length of the insulating core sections, is symmetrically interposed between the core sections at ⅔ the width of the panel.

Longitudinal outer edge surfaces of the outermost core sections lie in a plane common to the surface of the adjacent edges of the respective skin or face. The skins or faces of the panel project beyond the end limit of the core sections a distance sufficient to nest a length of dimension lumber or other structural component when inserted therein. The outward longitudinal edge portions of the outermost core sections are beveled for receiving splicing members joining one longitudinal edge of one panel to another.

One end surface of the core sections is provided with a central groove extending transversely of the panel for receiving electrical wiring. Additionally, each outer core section is provided with a longitudinal groove communicating with the panel end transverse groove and extending toward the other end of the panel adjacent the outwardly disposed surface of the respective reinforcing or stiffening member.

SUMMARY OF THE INVENTION

This invention in general comprises modular components for forming building structures of a particular design.

The components are formed from a plurality of structurally reenforced insulating panels joined in longitudinal edge fashion by splines and joined at their respective top and bottom ends by elongated dimension lumber for forming relatively large surfaces, such as floors, walls and roofs, with cut-outs for doors and windows in the wall areas.

The several roof sections resting at their depending edge portions on the upper limit of the structure walls are self supporting at their upper limit requiring only a keystone-type box frame at their uppermost edge limits.

Principal object of this invention is to provide light weight building structure modules formed by a plurality of insulating panels joined in longitudinal juxtaposed edge position including roof forming modules which are centrally self supporting.

Another object is to disclose a method of electrical prewiring a modular building structure and erecting a self supporting roof thereon.

BRIEF DESCRIPTION OF THE DRAWINGS

FIG. 1 is a partially exploded, partly in section, perspective view of a building constructed in accordance with the invention;

FIG. 2 is a fragmentary perspective view of the area encompassed by the arrow 2 of FIG. 1;

FIG. 3 is a fragmentary horizontal cross sectional view taken substantially along the line 3—3 of FIG. 1;

FIG. 5 is a perspective view of an alternative cap for the skylight opening of the building illustrated by FIG. 1;

FIG. 7 is a top view of a plurality of building structures formed in accordance with the present invention;

FIG. 8 is a vertical cross sectional view taken substantially along the line 8—8 of FIG. 7;

FIG. 8A is a fragmentary vertical cross sectional view, to an enlarged scale, of the area encompassed by the arrow 8A of FIG. 8;

FIG. 9 is a vertical cross sectional view taken substantially along the line 9—9 of FIG. 7;

FIG. 9A is a fragmentary vertical cross sectional view, to an enlarged scale, of the area encompassed by the arrow 9A of FIG. 9;

FIG. 10 is a vertical cross sectional view taken substantially along the line 10—10 of FIG. 7;

FIG. 10A is a fragmentary vertical cross sectional view, to an enlarged scale, of the area encompassed by the arrow 10A of FIG. 10;

FIG. 11 is a fragmentary vertical cross sectional view, to a different scale, taken substantially along the line 11—11 of FIG. 7; and, FIG. 12 is a top view illustrating an alternative configuration of a building constructed according to the invention.

DESCRIPTION OF THE PREFERRED EMBODIMENTS

Figure 6A:
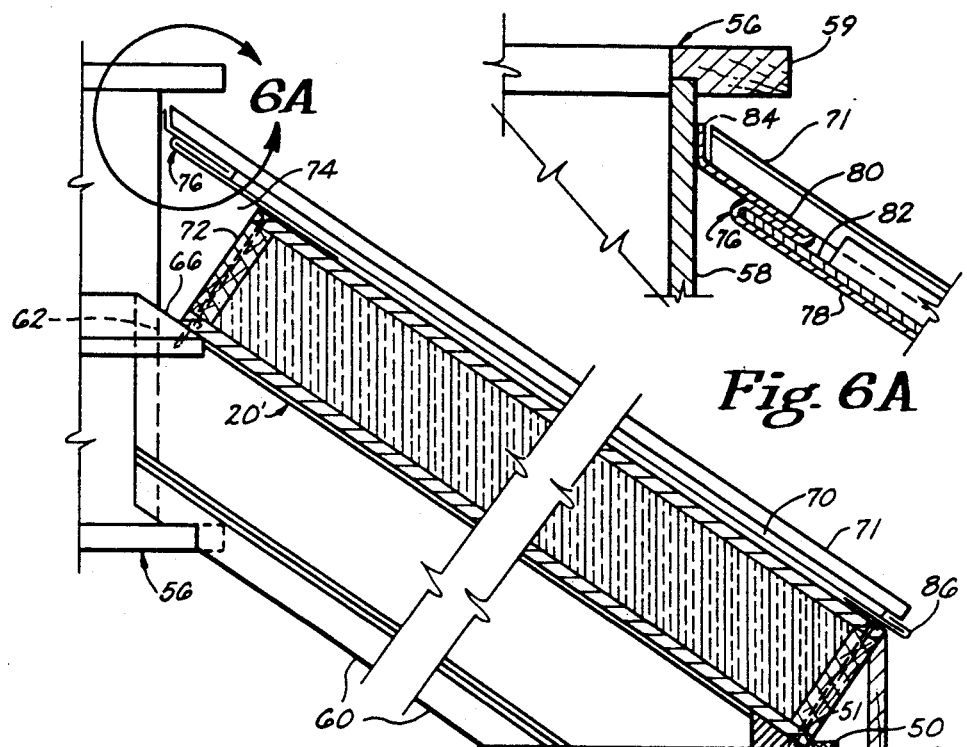
FIG. 6A is a fragmentary cross sectional view, to a further enlarged scale, of the area encompassed by the arrow 6A of FIG. 6.

Like characters of reference designate like parts in those figures of the drawings in which they occur.

In the drawings:

The reference numeral 10 indicates a building formed in accordance with this invention. The building 10 may be rectangular, as shown, or any desired perimeter configuration such as octagonal or hexagonal as at 10' (FIG. 12) having a floor 12, upstanding walls 14, a roof assembly 16 and a roof apex open box frame assembly 18. Both the walls and the roof of the building 10 are formed by juxtaposed panel members 20 and 20'. The structure of the panels 20 is fully disclosed in my above referred to copending application and briefly stated comprise structural boards 22 or skins (FIG. 3), bonded to opposing sides of a selected thickness of synthetic insulating material 24.

The skins 22 project beyond opposing ends of the insulating material 24 (FIG. 6) a selected distance sufficient for receiving dimension lumber for the reasons presently explained.

Longitudinal edges of each panel have the insulating material recessed inwardly adjacent the respective inner surface of the respective skin for receiving splines 26 (FIG. 3) for joining two adjacent panels 20 to each other in edgewise juxtaposed relation.

Each panel 20 is further provided with a pair of longitudinally extending stiffeners, not shown, extending the full length and transversely the thickness of the insulating material to add rigidity to the respective panel.

Figure 6:
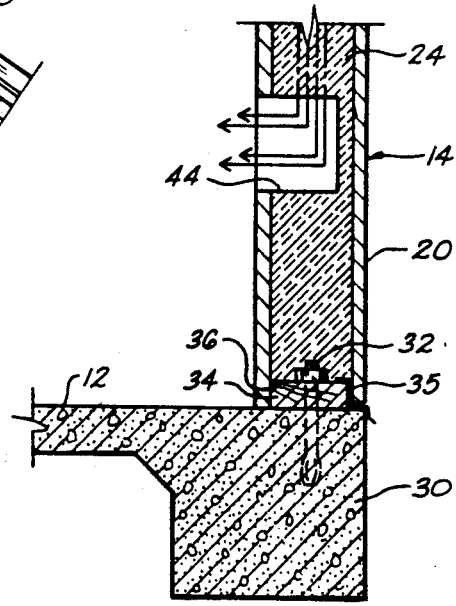
FIG. 6 is a fragmentary vertical cross sectional view, to an enlarged scale, taken substantially along the line 6—6 of FIG. 1.

Referring also to FIG. 6, the concrete floor 12 and the footing 30 forms the foundation for the building 10. Anchor bolts 32 in the concrete secure a sole plate 34 thereto. Elongated lengths of drain flashing, indicated by the bold line 35, overly the outer lateral and upper edge portions of the sole plate and foundation below the adjacent panel skin.

The required plurality of the panels 20 are joined together in longitudinal edgewise juxtaposed position by the splines 26 as described hereinabove, to form each wall 14.

Each wall 14 is raised into position over the sole plate 34 wherein the panel bottom recess 36, formed by the skins 22 projecting beyond the bottom end of the panel, nest the sole plate 34. The skins are secured to opposing sides of the sole plate and the outer skin caulked, not shown. Adjacent wall end panels are cooperatively rabbeted in interlocking relation.

Similarly, a top rail 38 is nested by a similar recess in the top edges in the respective panels 20, thus rigidly securing the top and bottom edges of the wall panels 20.

Prior to applying the top rail 38, electrical wires 40 which preferably comprises a complete wiring assembly or "harness" unit is laid in the panel top horizontal grooves 42 and communicating vertical grooves preformed in selected panels to electrical outlet box positions 44 located on panel inner surfaces.

After installing the wiring harness unit, a top plate 46 overlies and is secured to the top rail 38. A face plate 48 coextensive with the respective wall 14 overlies its upper outer edge portion under the overhanging edge of the plate 46.

A U-shaped wall reinforcing band 50 extends around the perimeter of the building at the upper limit of its walls and projects above the plane of the top plate to form a roof stop 51 for the reason presently explained.

Additionally, an angular metallic brace 52 of selected dimensions reenforces the respective corner of the building to prevent separation of the walls at the respective corner of the building as a result of the mass of the roof 16 thereon.

The roof assembly 16 similarly comprises four substantially identical truncated apex isosceles triangular roof sections 54 formed by a plurality of panels 20' having predetermined lengths.

The box frame means 18 functions similar to an arch keystone in supporting the roof 16. The box frame means 18 comprises an open end compression frame 56 formed by a plurality, equal with the number of walls 14, of vertically disposed side wall members 58 of selected dimension. The box frame 56 is horizontally disposed and serves as a reference structure joining the roof sections and is initially supported at a predetermined elevation above the plane defined by the wall top plate 46 by scaffolding, not shown, and positioned relative to the walls by a plurality of roof adjusting bars 60 (FIG. 2).

As illustrated by FIGS. 1 and 5, the compression frame 56 may be closed by any substantially conventional skylight cover 61, 61' or 61".

Each bar 60 is bifurcated at its upper end portion, as at 62 (FIG. 6), for nesting a corner portion of the frame 56. The bar 60 depending end portion overlies the top plate 46 at respective wall corner forming junctures of the building.

Each panel of the roof sections 54 is trimmed to required dimensions and placed in position with its top end edge 64 in supporting contact with a box frame wall surrounding outstanding ledge 66 on the frame wall 58. By way of example, the roof assembly is erected by first interposing the central most panel 20' of each roof section 54 between the upstanding stop 51, formed by the band 50 above the plate 46, and the cooperating compression box wall 58. The depending edge portion of each roof section is secured to the top plate 46 and abuts the upstanding edge of the band 50 (FIG. 6). The remaining roof section panels 20' are similarly installed in any preferred sequence. The roof panels 20' are similarly joined in edge to edge juxtaposed relation as described hereinabove for the panels 20. The under surface of the respective bar 60 forms a finished appearance for the roof sections junctures.

Roofing 70 is placed in overlying position on the respective roof section 54. Fascia boards 68 conceal the member 50 and the angle brackets 52 to provide a pleasing appearance.

The upwardly disposed end surface 72 of the respective roof section 54 defines a triangular, in transverse cross section, shaped void 74 (FIG. 6) adjacent the outer surface of the box frame wall 58. This space 74 is covered by flashing 76 extending around the perimeter of the box frame 56 and is characterized by a downwardly inclined planar section 78 overlying the adjacent upper outer edge surface of the respective roof section 54. This flashing 76 is transversely doubled back upon itself over the void 74, as at 80 (FIG. 6A), to form a space open downwardly in the plane of the roof for closely nesting the upwardly disposed end edge portion 82 of the roofing material which substantially precludes any separation in a curling action of the roofing 70 relative to the roofing panels 20'. The upturned upper terminal edge portion 84 of the flashing abuts the outer surface of the box frame wall 58.

The upwardly disposed end portion of roof juncture sheet caps 71 overlie the upper surface of the flashing 76 and underlie the over hanging lip 59 of the box frame.

Similarly, the depending end portion of the roof sheeting overhanging the lower end limit of the respective roof section 54 is provided with a U-shaped in cross section length of flashing 86 which nests the depending end edge portion of the roof sheeting, as illustrated by FIG. 6.

Figure 4:
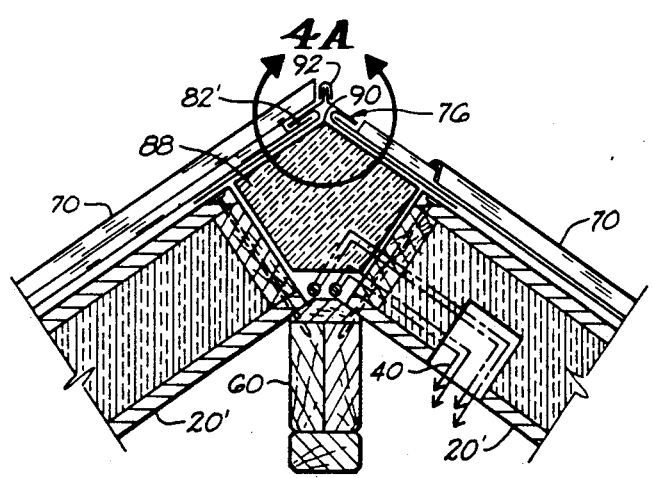
FIG. 4 is a fragmentary cross sectional view, to an enlarged scale, taken substantially along the line 4—4 of FIG. 1.
Figure 4A:
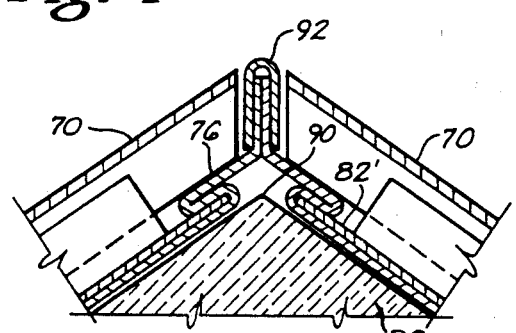
FIG. 4A is a view similar to FIG. 4, to a further enlarged scale, of the area encompassed by the arrow 4A of FIG. 4.

The respective longitudinal juxtaposed edges of the roof sections 54 form a polygonal, in transverse section, shaped void or opening between the longitudinal edges of the respective roof sections, as best shown by FIG. 4. This polygonal shaped opening is cooperatively filled with a length of polygonal, in cross section, shaped insulating material 88. The apex 90 of the polygonal shape is longitudinally covered by a pair of the flashing 76 disposed in inverted V-shaped relation. A coextensive inverted U-shaped cap 92 joins the upstanding lip portions 84 of the flashings. The flashings 76 are similarly doubled back upon themselves to receive an edge portion 82' of the roofing 70 to form a waterproof joint at this location. A portion of the polygonal shaped void receives wiring 40 in the manner described hereinabove.

Obviously selected panels of the walls 14 are apertured to form openings closed, respectively, by a door 65 or window 67, as desired.

Referring also to FIGS. 7-11, the building 10 may be connected in spaced relation with a plurality of other similar buildings of equal or smaller dimensions as at 100, 102 and 104, by covered walkways 106 and 108. Each of the structures 100, 102, and 104 are formed substantially identical with the building 10 as described hereinabove.

The walkway 106 walls (FIGS. 10 and 11) are similarly supported by a concrete floor and foundation 110. The shaded side or north wall 112 is formed by upright wall panels. Overlying roof panels 20" are joined in upper edge opposing relation by juxtaposed rabbeted edge dimension lumber members 114 (FIG. 8A) extending between and secured to the walls of the buildings 10 and 100, respectively. The longitudinal side edges of the roof panels abutting the respective building wall outer surface is secured thereto by other dimension lumber members 115 (FIG. 11). The member 115 being in turn longitudinally rabbeted for nesting an edge portion of the respective panel skin 22. The sunny side of the walkway 106 is formed by a relatively low in height wall 14' and a glass pane enclosed upper portion of the wall 14', as at 116. The glass 116 being supported between the short wall 14' and the top roof panel 20" in a substantially conventional manner as illustrated by FIG. 10A.

The walkway 108 may comprise a green house having its base portion substantially identical with respect to the concrete foundation and short wall 14' as illustrated by FIG. 10 and having a similar roof overlying the shaded side of the walkway with upright light and heat admitting glass panes 120 on the opposite side of the walkway 108 including a portion of the roof being formed by glass panel 122.

Alternatively, an enclosed walkway 124 is formed similar to the walkway 106 with the exception that imperforate panel walls 112' enclose both sides of the walkway and are joined with the overlying roof panels in the manner illustrated by FIG. 9.

Obviously the invention is susceptible to changes or alterations without defeating its practicability. Therefore, I do not wish to be confined to the preferred embodiment shown in the drawings and described herein.

I claim:

1. In a molecular building structure having a plurality of upright rigidly interconnected exterior side walls surrounding a floor, the improvement comprising:
    a modular roof structure extending upwardly from said exterior side walls in self supporting relation, said roof structure comprising:
    a plurality of planar modular roof sections of truncated apex triangular shape disposed in juxtaposed upwardly converging cooperative relation; and,
    box frame means interposed between the truncated apex ends of said roof sections.

2. The building structure according to claim 1 in which the box frame means comprises:
    a multiwall open frame; and,
    a weatherproof cover overlying the frame.

3. The building structure according to claim 2 and further including:
    a foundation supporting said walls;

a sole plate interposed between said walls and the foundation; and, other weatherproof flashing overlying the outer lateral and upper edge portion of the sole plate and foundation.

4. The building structure according to claim 2 in which each roof section comprises:

a plurality of rigidly interconnected juxtaposed insulating sandwich panels.

5. The building structure according to claim 4 and further including:

roofing overlying said roof structure; and, flashing means nesting an edge portion of said roofing for weathertight sealing edges of the latter together and with said box frame means.

6. In a modular building structure having a plurality of upright interconnected modular exterior side walls surrounding a floor, the improvement comprising:

a top plate overlying the respective exterior side wall;

a modular roof structure extending upwardly from said exterior side walls in self supporting relation, said roof structure comprising:

a plurality of juxtaposed sandwich panels forming modular planar roof sections of truncated apex isosceles triangular shape disposed in upwardly converging cooperative relation;

elongated reinforcing means coextensive with and contacting an outer perimeter edge portion of the roof structure; and, box frame means interposed between the truncated apex ends of said roof sections.

7. The building structure according to claim 6 in which the box frame means comprises:

a horizontally disposed open frame having vertical walls equal in number with the building structure side walls; and, weatherproof cover material overlying the frame.

8. In spaced-apart modular building structures each having a plurality of upright interconnected modular exterior side walls surrounding a floor, the improvement comprising:

a top plate overlying the respective wall;

a modular roof structure extending upwardly from said exterior side walls in self supporting relation, said roof structure comprising:

a plurality of juxtaposed sandwich panels forming modular planar roof sections of truncated apex isosceles triangular shape disposed in upwardly converging cooperative relation;

elongated reinforcing means coextensive with and contacting an outer perimeter edge portion of the roof structure;

box frame means interposed between the truncated apex ends of said roof sections; and, other juxtaposed wall and roof panel assemblies extending between and connected with outer wall surfaces of said building structures for forming enclosed walkways.

9. The method of erecting a self supporting roof on the upper limit of a modular structure defined by a plurality of rigidly joined together upstanding exterior side walls, comprising the steps of:

a) providing an open end compression frame defined by a like plurality of vertical frame walls;

b) providing a like plurality of cooperating triangular shaped modular roof sections each including juxtaposed sandwich panels defining a base edge and a truncated edge;

c) temporarily centrally supporting said compression frame on scaffolding at a predetermined elevation above a horizontal plane defined by the upper limit of said exterior walls with the compression frame vertical walls parallel with the respective exterior wall; and, d) interposing said roof sections in juxtaposed relation between the upper limit of the respective upstanding exterior wall and the cooperating compression frame vertical wall in a predetermined sequence.

10. The method according to claim 9 including the additional step of:

k) interposing a roof section position adjusting bar between the respective upstanding exterior side wall and compression frame vertical wall corner junctures.

11. The method according to claim 9 including the additional steps of:

e) providing a planar top plate and perimeter band coextensive with the upper limit and perimeter, respectively, of the exterior side walls;

f) securing said top plate to the upper limit of the said walls prior to step c); and, g) securing the perimeter band to the upper limit of the side walls in roof section stop forming relation prior to step d).

12. The method according to claim 11 including the additional step of:

h) interposing a roof section position adjusting bar between the respective upstanding exterior side wall and compression frame vertical wall corner junctures.

13. The method according to claim 12 in which step d) includes the additional steps of:

i) centrally interposing the center most panel of each roof section between the upper limit of the respective upstanding wall and the cooperating compression frame vertical wall; and, j) juxtaposing the remaining panels of each roof section with respective sides of the respective center most panel in a predetermined sequence.

14. A roof structure, comprising:

a plurality of juxtaposed planar modular roof sections of truncated apex triangular shape having base ends defining a roof perimeter and disposed in upwardly converging cooperative relation;

means abutting a perimeter edge portion of the roof structure for supporting the roof sections base ends against movement in a direction opposite their truncated apex ends; and, box frame means interposed between the truncated ends of said roof sections.

15. The roof structure according to claim 14 in which the box frame means comprises:

a horizontally disposed open frame having vertical walls equal in number with the number of truncated apex roof ends; and, cover means overlying the frame.

* * * * *